(12) United States Patent
Kwon et al.

(10) Patent No.: US 10,096,856 B2
(45) Date of Patent: Oct. 9, 2018

(54) ELECTRODE ASSEMBLY WITH TAPE AND ELECTROCHEMICAL DEVICE COMPRISING THE SAME

(71) Applicant: LG Chem, Ltd., Seoul (KR)

(72) Inventors: Tae-Hyun Kwon, Daejeon (KR); Kwan-Soo Lee, Daejeon (KR); Duk-Hyun Ryu, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 14/269,264

(22) Filed: May 5, 2014

(65) Prior Publication Data

US 2014/0242433 A1 Aug. 28, 2014

Related U.S. Application Data

(63) Continuation of application No. PCT/KR2013/011189, filed on Dec. 5, 2013.

(30) Foreign Application Priority Data

Dec. 7, 2012 (KR) .......... 10-2012-0142021
Dec. 7, 2012 (KR) .......... 10-2012-0142030
Dec. 4, 2013 (KR) .......... 10-2013-0150012

(51) Int. Cl.
| *H01M 10/04* | (2006.01) |
| *H01M 10/052* | (2010.01) |
| *H01M 10/0587* | (2010.01) |
| *H01M 2/16* | (2006.01) |

(52) U.S. Cl.
CPC ....... *H01M 10/0431* (2013.01); *H01M 2/168* (2013.01); *H01M 10/052* (2013.01); *H01M 10/0587* (2013.01); *Y10T 29/49108* (2015.01)

(58) Field of Classification Search
CPC .......... H01M 2/168; H01M 10/0431
See application file for complete search history.

(56) References Cited

U.S. PATENT DOCUMENTS

| 6,645,675 | B1 | 11/2003 | Munshi | |
| 2003/0224242 | A1 | 12/2003 | Kaito et al. | |
| 2004/0202928 | A1* | 10/2004 | Miyamoto | H01M 4/0402 429/137 |
| 2011/0014509 | A1 | 1/2011 | Kim | |

FOREIGN PATENT DOCUMENTS

| CN | 1469503 A | | 1/2004 |
| JP | 2005285691 A | | 10/2005 |
| JP | 2006-024452 A | | 1/2006 |
| JP | 2013-12349 | * | 1/2013 |
| JP | 2013073494 A | | 4/2013 |
| KR | 19990034347 U | | 8/1999 |
| KR | 2000-0066307 A | | 11/2000 |
| KR | 20080057629 A | | 6/2008 |
| KR | 20110039992 A | | 4/2011 |
| KR | 101106377 B1 | | 1/2012 |

* cited by examiner

*Primary Examiner* — Ladan Mohaddes

(74) *Attorney, Agent, or Firm* — Lerner, David, Littenberg, Krumholz & Mentlik, LLP

(57) ABSTRACT

The present disclosure relates to an electrode assembly for preventing a phenomenon of a separator being pressed and/or disconnected from occurring when a free edge electrode is wound into a jelly roll, and an electrochemical device comprising the electrode assembly.

13 Claims, 3 Drawing Sheets

ELECTRODE ASSEMBLY WITH TAPE AND ELECTROCHEMICAL DEVICE COMPRISING THE SAME

CROSS-REFERENCE TO RELATED APPLICATION

The present application is a continuation of International Application No. PCT/KR2013/011189 filed on Dec. 5, 2013, which claims priority to Korean Patent Application No. 10-2012-0142021 filed in the Republic of Korea on Dec. 7, 2012, Korean Patent Application No. 10-2012-0142030 filed in the Republic of Korea on Dec. 7, 2012, and Korean Patent Application No. 10-2013-0150012 filed in the Republic of Korea on Dec. 4, 2013, the disclosures of which are incorporated herein by reference.

TECHNICAL FIELD

The present disclosure relates to an electrode assembly with a tape and an electrochemical device comprising the same, and more particularly, to an electrode assembly for preventing a phenomenon of a separator being pressed and/or disconnected from occurring when a free edge electrode is wound into a jelly roll, and an electrochemical device comprising the electrode assembly.

BACKGROUND ART

Recently, there has been growing interest in energy storage technologies in the field of electrochemical devices. As the application fields of energy storage technologies have been extended to mobile phones, camcorders, lap-top computers and even electric cars, efforts have increasingly been made towards the research and development of batteries. In this aspect, electrochemical devices have attracted the most attention. The development of rechargeable secondary batteries has been the focus of particular interest.

Referring to FIG. 1, an exemplary embodiment of an electrode used in a conventional secondary battery includes an electrode 1 having an electrode active material layer 2, 2' in which the electrode active material layer 2, 2' is formed on both surfaces of a current collector 3 having a shape of a long sheet, and an active material-free portion (a) not covered with the electrode active material layer 2, 2' is formed at an end portion of the current collector 3.

When an electrode assembly is formed by stacking an electrode and a separator and wound into a jelly roll, there may occur a phenomenon in which the separator is pressed by an edge of the electrode, to be exact, an edge of a portion in which electrode winding is completed, and as described in the foregoing, an electrode having an active-material free portion (a) has an advantage of alleviating or reducing a phenomenon, in which a separator is pressed by an edge of a portion where electrode winding is completed, due to the active-material free portion (a), and consequently relieving separator stress, thereby preventing a separator disconnection phenomenon from occurring.

However, in case the electrode 1 having the active material-free portion (a) is used, an active material slurry scatters over an active material-free portion of a current collector during coating of an electrode active material, in particular, a cathode active material, and as a result, an active material island is formed, and such an island may cause an internal short circuit of a battery when the current collector sheet stretches by the repetition of shrinkage and expansion of a jelly roll in a high capacity model life test or the like.

Accordingly, as proposed in FIG. 2, the free edge electrode 1 manufactured by forming the electrode active material layer 2, 2' on both surfaces of the current collector 3 and cutting off to eliminate an active material-free portion is proposed.

In the specification, the term 'free edge electrode' is understood as representing an electrode in which both an active material layer and a current collector form an edge at the same location, as proposed in FIG. 2.

However, because the free edge electrode proposed in FIG. 2 avoids a problem of an island being formed by the scattering of an active material but raises a high density step issue due to the electrode active material layer and the current collector forming an edge at the same location, stress applied to the separator 5 by the edge of the electrode at a portion where winding of a stack of the electrode 1 and the separator 5 into a jelly roll is completed is even higher than stress applied when winding into a jelly roll using an electrode having an active material-free portion, and as a result, an issue with a separator being pressed and/or disconnected is exacerbated.

DISCLOSURE

Technical Problem

In an exemplary embodiment of the present disclosure, provided is an electrode assembly including a free edge electrode for reducing or preventing a phenomenon in which a separator is pressed and/or disconnected when wound into a jelly roll.

Also, in another exemplary embodiment of the present disclosure, provided is an electrochemical device including the electrode assembly.

Also, in still another exemplary embodiment of the present disclosure, provided is a method of manufacturing the electrode assembly in a simpler manner.

Technical Solution

According to an exemplary embodiment of the present disclosure, there is provided an electrode assembly including an electrode in which an electrode active material layer and a current collector forms an edge at a same location, wherein an insulating tape is interposed between the edge of the electrode and a separator.

The insulating tape may have a width equal to an electrode width.

The edge of the electrode may correspond to an edge located at a winding completion portion when the electrode assembly is wound into a jelly roll.

The electrode may include either or both of a cathode and an anode.

The insulating tape may be attached to and stacked on the separator, and the electrode may be stacked on the insulating tape such that the edge of the electrode is disposed on the insulating tape.

An insulating tape or an elastic material may be further attached to an edge of the electrode located at the electrode winding completion portion without coming into contact with the separator among the edge of the electrode.

The elastic material may be styrene-butadiene rubber.

In the electrode assembly, two insulating tapes may be used, one of the two insulating tapes may be attached to an end portion of a lower surface of the electrode and the other may be attached to an end portion of an upper surface of the electrode, and each of the insulating tapes may be tightly attached to an edge along a thickness-wise direction of the electrode perpendicular to the lower surface of the electrode and the upper surface of the electrode.

In the electrode assembly, one insulating tape may be used, and the insulating tape may be continuously attached to an end portion of a lower surface of the electrode, an edge along a thickness-wise direction of the electrode perpendicular to the lower surface of the electrode, and an end portion of an upper surface of the electrode.

According to another exemplary embodiment of the present disclosure, there is provided a method of manufacturing an electrode assembly including stacking an insulating tape on a separator, and stacking the electrode on the insulating tape such that an edge of an electrode winding completion portion is disposed on the insulating tape.

The method may further include applying an insulating tape or elastic material slurry to an edge of the electrode located at the electrode winding completion portion without coming into contact with the separator among the edge of the electrode.

According to still another exemplary embodiment of the present disclosure, there is provided a method of manufacturing an electrode assembly including attaching an insulating tape to an end portion of each of an upper surface and a lower surface of an electrode, attaching the insulating tape to an edge along a thickness-wise direction perpendicular to each of the upper surface of the electrode and the lower surface of the electrode, and stacking the electrode on the separator.

According to yet another exemplary embodiment of the present disclosure, there is provided an electrochemical device including the above-described electrode assembly in a type of a jelly roll.

The electrochemical device may be a lithium secondary battery.

Advantageous Effects

According to an exemplary embodiment of the present disclosure, there is provided an effect of reducing or preventing a phenomenon, in which a separator is pressed and/or disconnected, by interposing an insulating tape between the separator and an edge of an electrode at a portion where electrode winding is completed.

Also, according to another exemplary embodiment of the present disclosure, there is provided a procedural advantage of applying the insulating tape to the electrode by a simpler process.

DESCRIPTION OF THE PREFERRED EMBODIMENT

Hereinafter, the present disclosure will be described in detail. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the spirit and scope of the disclosure.

In an exemplary embodiment of the present disclosure, there is provided an electrode assembly including a free edge electrode, a separator, and an insulating tape interposed between the free edge electrode and the separator. Particularly, an edge of the electrode preferably corresponds to an edge at a winding completion portion where the separator is most vulnerable to stress due to the presence of the free edge electrode when the electrode assembly is wound into a jelly roll.

Figure 1:
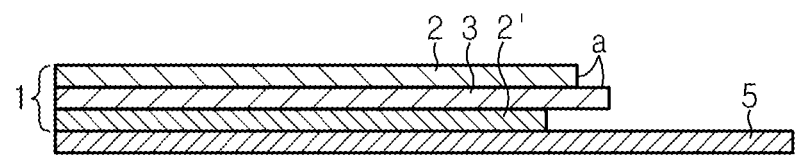
FIG. 1 is a cross-sectional view schematically illustrating an exemplary embodiment in which an electrode having an active material-free portion is stacked on a separator.
Figure 2:
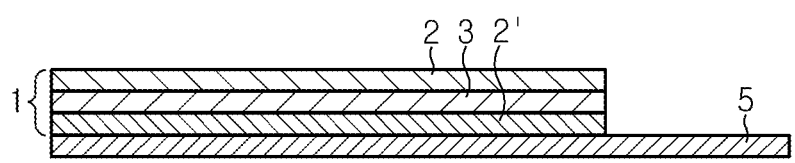
FIG. 2 is a cross-sectional view schematically illustrating an exemplary embodiment in which a free edge electrode is stacked on a separator.
Figure 3:
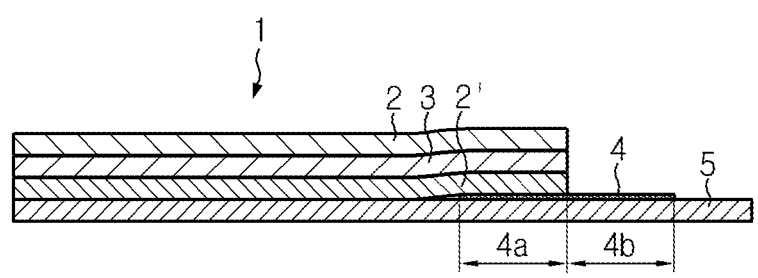
FIG. 3 is a cross-sectional view illustrating an exemplary embodiment of the present disclosure in which an insulating tape is stacked on a separator and a free edge electrode is stacked on the separator and the insulating tape.

To describe the present disclosure in more detail, reference is made to FIG. 3 illustrating an exemplary embodiment of the present disclosure.

Referring to FIG. 3, an insulating tape 4 is stacked on a separator 5, and an electrode 1 is stacked on the insulating tape 4 and the separator 5. Particularly, an edge of the electrode is stacked on the insulating tape 4.

The electrode 1 may include a current collector 3 and an active material layer 2, 2' formed on at least one surface of the current collector 3, and correspond to the free edge electrode 1 in which the current collector 3 and the active material layer 2, 2' form the edge at the same location.

Figure 4:
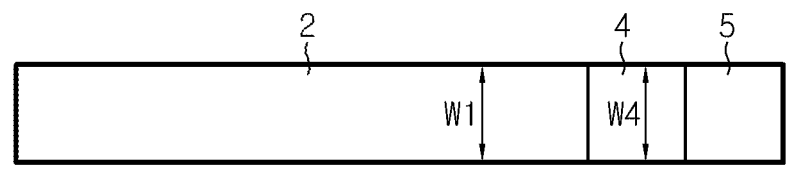
FIG. 4 is a top view of FIG. 3.

As seen from FIG. 4, a width W4 of the insulating tape is preferably larger than or equal to an electrode width W1 to achieve the object of the present disclosure to prevent the separator from being pressed and/or disconnected. In the present disclosure, 'equal' is understood as including an allowable range of error in the art.

There is no special limitation in a material for the insulating tape if it has an insulating property and is non-reactive in an electrolyte solution. A non-limiting example of the material for the insulating tape satisfying such characteristics may include polyethylene, polypropylene, polyester, nylon, vinyl chloride, Teflon™, polyimide, Kapton™, polypheylenesultide, and the like. Also, the insulating tape may have elasticity. A gap phenomenon between the electrode and the separator appearing due to the insulating tape interposed between the electrode and the separator may be reduced by using an elastic insulating tape.

The insulating tape is not specially limited in terms of thickness so long as it is appropriate for the object of the present disclosure. That is, the insulating tape is required to impede an unnecessary increase in battery volume while reducing/preventing a phenomenon in which the separator is pressed and/or disconnected. Particularly, in case an electrochemical device is manufactured in a way of winding the electrode assembly of the present disclosure into a jelly roll, receiving it in a battery casing, and injecting a liquid electrolyte therein, it is not required for the separator and the electrode to be in perfect close contact for the electrolyte to move between the separator and the electrode. In an exemplary embodiment of the present disclosure, the thickness of the insulating tape may be in a range of 10 to 20 μm.

Referring to FIG. 3, there is no special limitation in a length 4a of the insulating tape 4 interposed between the electrode 1 and the separator 5 and a length 4b of the insulating tape 4 exposed through the separator 5 so long as they are appropriate for the object of the present disclosure. For example, in an exemplary embodiment of the present disclosure, the length 4a of the insulating tape interposed between the electrode and the separator may be in a range of 5 to 20 mm, and the length 4b of the insulating tape exposed through the separator 5 may be in a range of 5 to 10 mm.

The insulating tape 4 may have an adhesive layer formed on one surface thereof. In this instance, the insulating tape 4 is stacked on the separator 5 such that the adhesive layer is attached to the separator 5. An adhesive material applicable to the insulating tape is not limited to a specific type if it can be dissolved in an electrolyte solution and provide a predetermined level of adhesive strength between the electrode and the separator. Alternatively, the insulating tape may be attached to the separator by heat sealing or heat fusion.

The electrode may represent either or both a cathode and an anode. Accordingly, the exemplary embodiment may include an embodiment in which the insulating tape is interposed between the cathode and the separator, an embodiment in which the insulating tape is interposed between the anode and the separator, and an embodiment in which the insulating tape is interposed between the cathode and the separator and between the anode and the separator.

In the present disclosure, there is no special limitation in an active material for the electrode.

The separator usable in the present disclosure is not limited to a specific type, and may use any separator usable in the art, for example, a porous polymer separator, a composite separator having a porous coating layer formed on at least one surface of a porous polymer substrate, an engineering plastic-based separator, and the like. In this instance, the 'porous polymer substrate' represents a substrate made from a material generally used as a separator material in the art, for example, a polyolefin-based compound, and is understood as including both a film substrate and a non-woven substrate. Also, the 'porous coating layer' includes a mixture of inorganic particles and a binder polymer, and represents a structure in which the inorganic particles are bonded to one another by the binder polymer while the inorganic particles are packed in contact with one another, where interstitial volumes between the inorganic particles are formed thereby, and such interstitial volumes are defined as an empty space and form pores.

Figure 5:
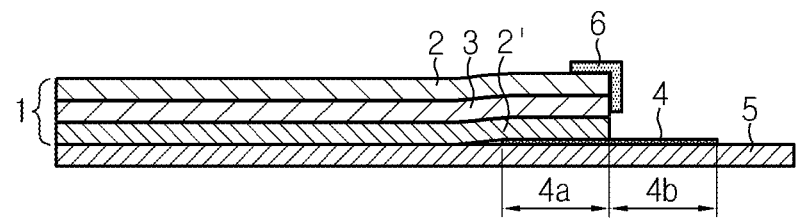
FIG. 5 is a cross-sectional view illustrating an exemplary embodiment of the present disclosure in which an insulating tape is stacked on a separator, a free edge electrode is stacked on the separator and the insulating tape, and an elastic material is applied to an edge of the free edge electrode at a portion where winding is completed without coming in contact with the separator.

Also, referring to FIG. 5, according to another exemplary embodiment of the present disclosure, in addition to the insulating tape 4 interposed between the electrode 1 and the separator 5, an additional insulating tape or an elastic material 6 may be further applied to the edge of the free edge electrode at the winding completion portion without coming into contact with the separator.

The insulating tape 6 may correspond to an insulating tape of an identical material to or a different material from the insulating tape 4 interposed between the electrode 1 and the separator 5. As the elastic material 6, a non-conductive material having elasticity such as styrene-butadiene rubber may be used.

There is no special limitation in a point in time at which the insulating tape or elastic material 6 is applied to the electrode, and for example, the insulating tape or elastic material 6 may be applied at an arbitrary point in time before stacking the electrode 1 on the separator 5 or an arbitrary point in time after stacking the electrode 1 on the separator 5.

When the insulating tape 6 is applied to the electrode, the adhesive surface of the insulating tape is attached to an upper surface of the electrode and a portion perpendicular to the upper surface of the electrode.

When the elastic material such as a styrene-butadiene rubber slurry is applied to the electrode, a follow-up process may be required to make dry after applying the slurry to the electrode.

Figure 6A:
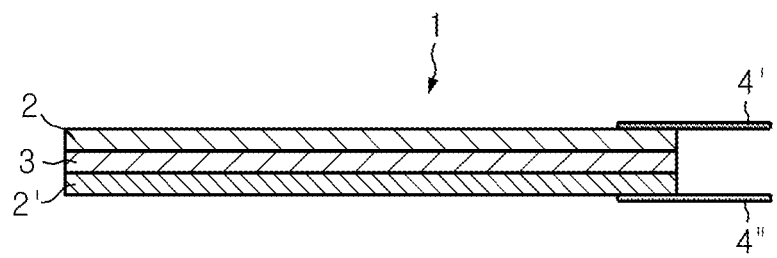
FIG. 6a is a cross-sectional view schematically illustrating an exemplary embodiment in which an insulating tape is attached to an end portion of each of an upper surface and a lower surface of a free edge electrode including a portion where winding of the free edge electrode is completed.
Figure 6B:
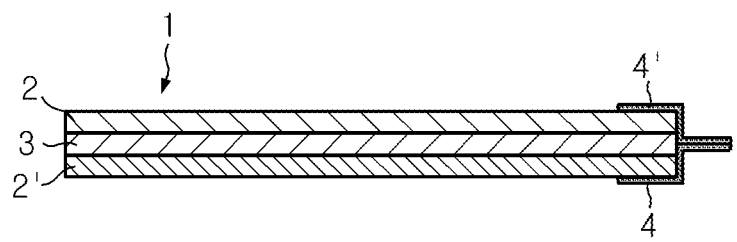
FIG. 6b is a cross-sectional view schematically illustrating an exemplary embodiment in which the insulating tape of FIG. 6a attached to the end portion of each of the upper surface and the lower surface of the electrode is attached to an edge along a thickness-wise direction of the electrode perpendicular to each of the upper surface and the lower surface of the electrode.
Figure 6C:
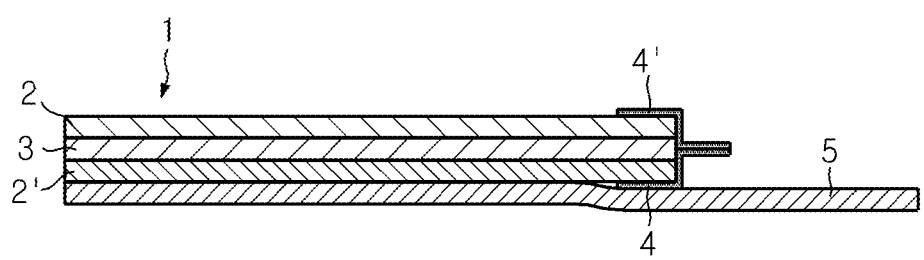
FIG. 6c is a cross-sectional view schematically illustrating an exemplary embodiment in which a free edge electrode with the insulating tape of FIG. 6b is stacked on a separator.
Figure 7:
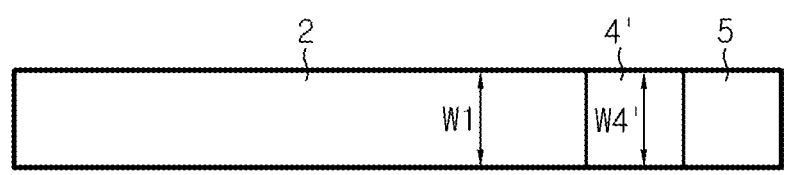
FIG. 7 is a top view of FIG. 6c.

Another exemplary embodiment of the present disclosure is illustrated in FIGS. 6a through 6c.

Referring to FIG. 6a, two insulating tapes 4', 4" are prepared, and adhesive surfaces of the insulating tapes 4', 4" are attached to an upper surface and a lower surface of the electrode 1. The two insulating tapes 4', 4" may have the same length.

Subsequently, referring to FIG. 6b, each of the insulating tapes 4', 4" is tightly attached to a cross section along a thickness-wise direction of the electrode perpendicular to the upper surface of the electrode and a cross section along a thickness-wise direction of the electrode perpendicular to the lower surface of the electrode. If there is a residual insulating tape after attaching as described in the foregoing, the residual insulating tape may form a tail portion as shown in FIG. 6b. The tail portion may help in reducing a phenomenon in which the separator is pressed and/or disconnected.

Subsequently, as shown in FIG. 6c, the electrode 1 having the insulating tapes 4', 4" thereto is stacked on the separator 5.

A process of manufacturing the exemplary embodiment includes attaching the two insulating tapes 4', 4" to an end portion of each of the upper surface and the lower surface of the electrode and tightly attaching the insulating tapes 4', 4" to the edge along the thickness-wise direction of the electrode, and thus has an advantage of an easy and simple process. This process has a very favorable procedural advantage in light of the fact that complex facility and process are required to bend the insulating tape at the center in an exemplary embodiment of FIG. 8 to be described later. Also, according to the process of FIGS. 6a through 6c, there is an advantage that the insulating tape can be attached to the electrode more tightly.

Since the description of the exemplary embodiments of FIGS. 3 through 5 may be equally applied to the insulating tape used in FIGS. 6a through 6c in connection with the material, thickness and width of the adhesive tape and the adhesive material used in the insulating tape, reference is made to the description of FIGS. 3 through 5.

There is no special limitation in a length of the insulating tape attached to an end portion of each of the upper surface and the lower surface of the electrode so long as it is appropriate for the object of the present disclosure. In an exemplary embodiment of the present disclosure, the length of the insulating tape attached to an end portion of each of the upper surface or the lower surface of the electrode may be in a range of 5 to 20 μm, and a length of the tail portion may be in a range of 5 to 10 μm.

Figure 8:
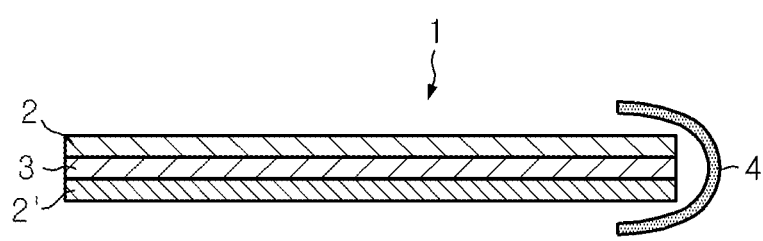
FIG. 8 is a cross-sectional view schematically illustrating an exemplary embodiment in which an insulating tape is bent at the center and attached to an electrode.

Another exemplary embodiment of the present disclosure is illustrated in FIG. 8.

Referring to FIG. 8, one insulating tape 4 is prepared by bending the center, and the insulating tape 4 is attached to a free edge electrode.

The electrode with the insulating tape manufactured in FIG. 8 also has an effect of reducing or preventing a phenomenon in which a separator is pressed and/or disconnected when wound into a jelly roll. However, in this exemplary embodiment, as described in the foregoing, a facility for bending the center of the insulating tape 4 is needed and attention should be paid to tightly attach the insulating tape 4 having a curvature to an end portion of an upper surface of the electrode, an edge along the thicknesswise direction perpendicular to the upper surface, and an end portion of a lower surface of the electrode.

An electrochemical device may be manufactured by winding an electrode assembly manufactured as described in the foregoing into a jelly roll, receiving it in a battery casing, and injecting an electrolyte solution therein, and the electrochemical device usable in the present disclosure is described below.

There is no special limitation in a cathode active material, an anode active material, a cathode current collector, and an anode current collector usable in the present disclosure if they are those usable in the art.

As the cathode active material, lithium-containing transition metal oxide or a lithium chalcogenide compound may be used, and a representative example may include, but is not limited to, metal oxide such as $LiCoO_2$, $LiNiO_2$, $LiMnO_2$, $LiMn_2O_4$, or $LiNi_{1-x-y}Co_xM_yO_2$ ($0 \leq x \leq 1$, $0 \leq y \leq 1$, $0 \leq x+y<1$, M represents a metal such as Al, Sr, Mg, and La).

As the anode active material, a carbon material such as crystalline carbon, amorphous carbon, a carbon composite and a carbon fiber, a lithium metal, and a lithium alloy may be used, however the present disclosure is not limited thereto.

As the cathode current collector, stainless steel, nickel, aluminum, titanium, or alloys thereof, and aluminum or stainless steel treated with carbon, nickel, titanium and silver on the surface may be used.

As the anode current collector, stainless steel, nickel, copper, titanium, or alloys thereof, and copper or stainless steel treated with carbon, nickel, titanium and silver on the surface may be used.

The electrolyte solution usable in an exemplary embodiment of the present disclosure may be an electrolyte solution in which a salt, for example, of $A^+B^-$ structure, where $A^+$ represents an ion including an alkali metal cation such as $Li^+$, $Na^+$ and $K^+$, or combinations thereof, and $B^-$ represents an ion including an anion such as $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$ and $C(CF_2SO_2)_3^-$, or combinations thereof, is dissolved or dissociated in an organic solvent including, but is not limited to, propylene carbonate (PC), ethylene carbonate (EC), diethyl carbonate (DEC), dimethyl carbonate (DMC), dipropyl carbonate (DPC), dimethylsulfoxide, acetonitrile, dimethoxyethane, diethoxyethane, tetrahydrofuran, N-methyl-2-pyrrolidone (NMP), ethylmethylcarbonate (EMC), gamma butyrolactone, or mixtures thereof.

Injection of the electrolyte solution may be performed in a proper step among a battery fabrication process based on a manufacturing process and required physical properties of a final product. That is, injection of the electrolyte solution may be applied before battery assembling or in a final step of battery assembling.

What is claimed is:

1. An electrode assembly comprising:
    an electrode having an electrode active material layer formed on at least one surface of a current collector, the electrode active material layer extending in a first direction to a first peripheral edge and the current collector extending in the first direction to a second peripheral edge, the first and second peripheral edges together forming a free edge of the electrode at a same location, the electrode defining a lower surface;
    a separator defining an upper surface that faces and confronts the lower surface of the electrode, the separator extending in the first direction to a third peripheral edge beyond the same location; and
    an insulating adhesive tape adhered to the upper surface of the separator and having first and second portions, the first portion including at least half of the insulating adhesive tape and being interposed between the lower surface of the electrode and the upper surface of the separator, the second portion extending in the first direction beyond the free edge of the electrode to a fourth peripheral edge of the insulating adhesive tape, the third peripheral edge of the separator extending in the first direction beyond the fourth peripheral edge of the insulating adhesive tape.

2. The electrode assembly according to claim 1, wherein the insulating adhesive tape has a width equal to a width of the electrode.

3. The electrode assembly according to claim 1, wherein the free edge of the electrode corresponds to an edge located at a winding completion portion when the electrode assembly is wound into a jelly roll.

4. The electrode assembly according to claim 1, wherein the electrode includes either or both of a cathode and an anode.

5. The electrode assembly according to claim 3, wherein an elastic material is further attached to the edge of the electrode located at the winding completion portion without coming into contact with the separator at the free edge of the electrode.

6. The electrode assembly according to claim 5, wherein the elastic material is styrene-butadiene rubber.

7. A method of manufacturing the electrode assembly defined in the claim 4, the method comprising:
    stacking the insulating adhesive tape on the separator; and
    stacking the electrode on the insulating adhesive tape.

8. The method according to claim 7, further comprising:
    applying an elastic material slurry to an edge of the electrode located at an electrode winding completion portion without the elastic material slurry coming into contact with the separator at the free edge of the electrode.

9. An electrochemical device comprising the electrode assembly according to claim 1 wound into a jelly roll.

10. The electrochemical device according to claim 9, wherein the electrochemical device is a lithium secondary battery.

11. The electrode assembly according to claim 1, wherein the first portion of the insulating adhesive tape and the second portion of the insulating adhesive tape are equal in length.

12. The electrode assembly according to claim 1, wherein the first portion of the insulating adhesive tape is longer than the second portion of the insulating adhesive tape.

13. The electrode assembly according to claim 1, wherein the insulating adhesive tape has an adhesive layer on one surface thereof, the adhesive layer being adhered to the upper surface of the separator.

\* \* \* \* \*